US012009173B2

United States Patent
Willis et al.

(10) Patent No.: US 12,009,173 B2
(45) Date of Patent: Jun. 11, 2024

(54) WIRELESS BATTERY-POWERED SWITCH

(71) Applicant: Hubbell Incorporated, Shelton, CT (US)

(72) Inventors: Timothy Willis, Clemson, SC (US); Edward Rivas, Austin, TX (US); Theodore Eric Weber, Round Rock, TX (US); Jim Loring, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/074,880

(22) Filed: Dec. 5, 2022

(65) Prior Publication Data

US 2023/0109898 A1     Apr. 13, 2023

Related U.S. Application Data

(63) Continuation of application No. 17/242,917, filed on Apr. 28, 2021, now Pat. No. 11,545,314.

(60) Provisional application No. 63/016,403, filed on Apr. 28, 2020.

(51) Int. Cl.
*H01H 9/02* (2006.01)
*H04W 52/02* (2009.01)

(52) U.S. Cl.
CPC ...... *H01H 9/0271* (2013.01); *H04W 52/0254* (2013.01)

(58) Field of Classification Search
CPC .................. H01H 9/0271; H04W 52/0254
See application file for complete search history.

(56) References Cited

U.S. PATENT DOCUMENTS

| 8,498,572 | B1 | 7/2013 | Schooley | |
|---|---|---|---|---|
| 10,594,990 | B1 | 3/2020 | Lemberger et al. | |
| 2009/0111378 | A1* | 4/2009 | Sheynman | H04W 4/80 455/41.1 |
| 2010/0128636 | A1* | 5/2010 | Seeling | H04W 8/005 370/254 |
| 2016/0040903 | A1 | 2/2016 | Emmons et al. | |
| 2016/0187023 | A1* | 6/2016 | Bevan | F24F 11/89 236/1 C |
| 2016/0224572 | A1 | 8/2016 | Le et al. | |

(Continued)

FOREIGN PATENT DOCUMENTS

CN     201623754 U  * 11/2010
KR     201601141120   12/2016

(Continued)

OTHER PUBLICATIONS

PCT/US2021/029630 International Search Report and Written Opinion dated Aug. 3, 2021.

(Continued)

*Primary Examiner* — Keith Ferguson
(74) *Attorney, Agent, or Firm* — Robinson + Cole LLP

(57) ABSTRACT

An apparatus for a wireless switch. In some embodiments, the wireless switch includes an input device, a radio, a memory, and an electronic processor. The electronic processor is configured to place a mode selection indicator in an asserted state in response to a first manipulation of the input device, and to operate the wireless switch in a wireless mesh network communication mode in response to the mode selection indicator being placed in the asserted state.

20 Claims, 2 Drawing Sheets

(56) References Cited

U.S. PATENT DOCUMENTS

| | | |
|---|---|---|
| 2017/0188182 A1 | 6/2017 | Jin et al. |
| 2019/0124751 A1 | 4/2019 | Bailey et al. |
| 2020/0068627 A1 | 2/2020 | Zhang |
| 2020/0081408 A1* | 3/2020 | Wilberforce ...... H02J 13/00026 |
| 2020/0278871 A1 | 9/2020 | Jin |

FOREIGN PATENT DOCUMENTS

| | | |
|---|---|---|
| WO | 2017140565 | 8/2017 |
| WO | 2019/100704 A1 | 5/2019 |

OTHER PUBLICATIONS

Enlighted, A Siemens Company, Enlighted Room Control specification sheet, copyright 2020.

Lutron, Pico Wireless Control specification sheet, Mar. 5, 2018.

* cited by examiner

WIRELESS BATTERY-POWERED SWITCH

PRIORITY CLAIM

The present application is a continuation of U.S. application Ser. No. 17/242,917, title "Wireless Battery-Powered Switch," having a filing date of Apr. 28, 2021, which is based on and claims priority to U.S. Provisional Patent Application No. 63/016,403 "Wireless Battery-Powered Switch," having a filing date of Apr. 28, 2020, the entire contents of which is incorporated by reference herein.

FIELD

Embodiments relate to a wireless battery-powered switch.

BACKGROUND

Some switches may wirelessly connect to other devices.

SUMMARY

In at least one aspect, a wireless switch includes an input device, a radio, a memory, and an electronic processor. The electronic processor is configured to place a mode selection indicator in an asserted state in response to a first manipulation of the input device, and to operate the wireless switch in a wireless mesh network communication mode in response to the mode selection indicator being placed in the asserted state.

In at least one aspect, a method of selecting an operating mode for a wireless switch includes detecting, via an electronic processor of the wireless switch, a first manipulation of an input device of the wireless switch; placing, via the electronic processor, a mode selection indicator in an asserted state in response to detecting the first manipulation of the input device; and, operating, via the electronic processor, the wireless switch in a wireless mesh network communication mode in response to the mode selection indicator being placed in the asserted state.

In at least one aspect, a non-transitory, computer-readable medium contains instructions that, when executed by an electronic processor, are configured to perform a set of functions, the set of functions including: detecting a first manipulation of an input device of a wireless switch; placing a mode selection indicator of the wireless switch in an asserted state in response to detecting the first manipulation of the input device; and, operating the wireless switch in a wireless mesh network communication mode in response to the mode selection indicator being placed in the asserted state.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), one or more programmable logic controllers (PLCs), and various connections (for example, a system bus) connecting the various components.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. As used within this document, the word "or" may mean inclusive or. As a non-limiting example, if this document states "item Z comprising element A or B," this may be interpreted to disclose an item Z comprising only element A, an item Z comprising only element B, as well as an item Z comprising elements A and B.

Figure 1:
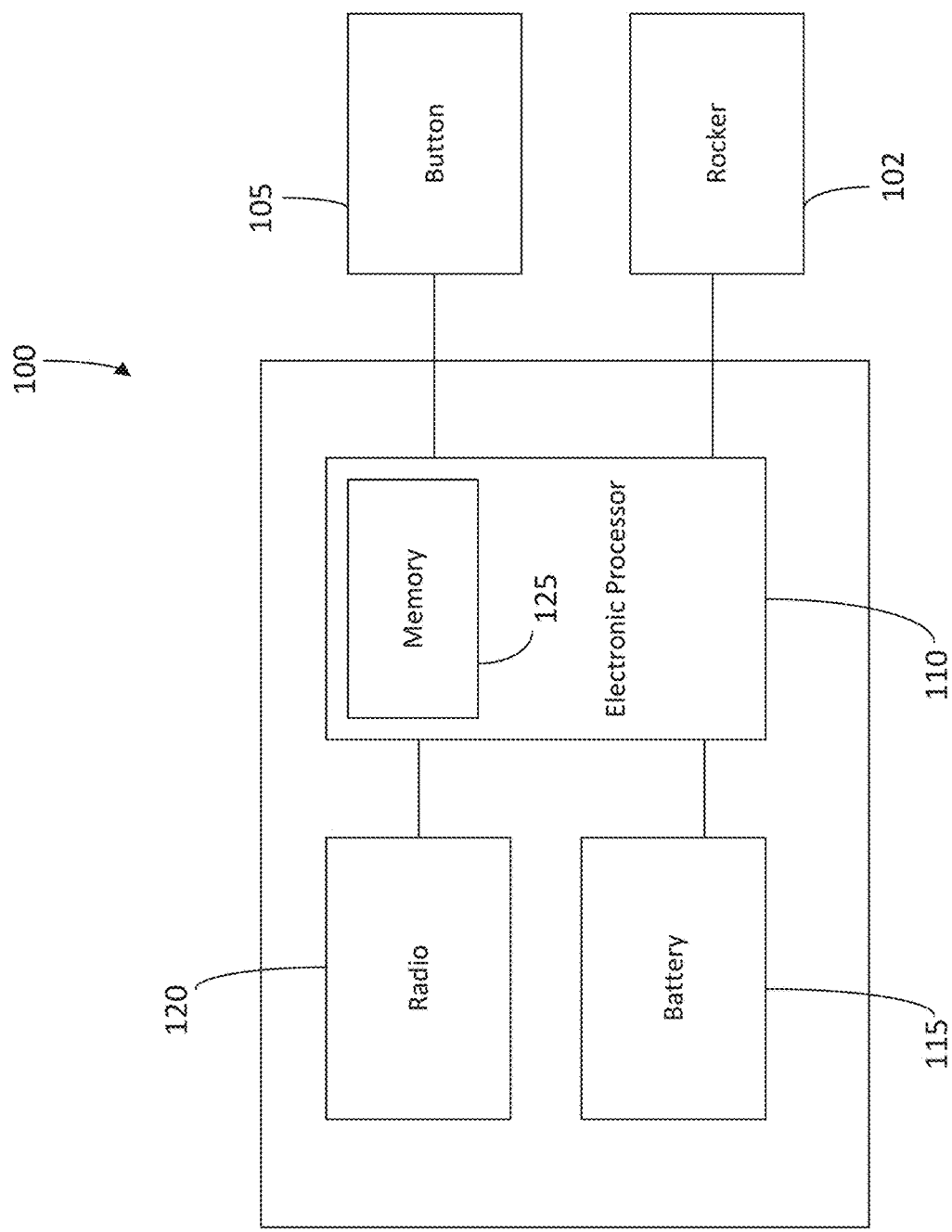
FIG. 1 illustrates a wireless switch.

FIG. 1 illustrates a wireless switch 100 according to at least one embodiment. The wireless switch 100 includes a button 105, an electronic processor 110, a battery 115, a radio 120, and a memory 125.

In the embodiment shown, the button 105 may be actuated by a user of the wireless switch 100 to change an operating mode of the wireless switch 100, as described below. When the button 105 is held by the user for a configurable period of time, for example 10 seconds, the electronic processor 110 of the wireless switch 100 is configured to switch the operating mode of the wireless switch 100 as described below. The electronic processor 110 controls the operation of the wireless switch 100. That is, the electronic processor 110 may execute instructions stored in the memory 125 and operate the wireless switch 110 according to those instructions. For example, the electronic processor 110 may execute the instructions and transmit an addressed message on a wireless mesh network using radio 120. For example, in response to a rocker 102 of the wireless switch 110 being toggled, the electronic processor 110 may execute an instruction from memory that causes the radio 120 to transmit a message on the mesh network that commands certain lighting devices connected to the mesh network to turn on or off.

In the embodiment shown in FIG. 1, the battery 115 provides power to the electronic processor 110 and the radio 120. In one at least one embodiment, the battery 115 is replaceable and, therefore, does not need any exterior wiring to recharge the battery. The battery 115 may be a 2032-coin cell battery with a battery life designed to last 5 years based upon a set of assumptions such as an average of 10 momentary button presses per day, one firmware update, and one device commissioning event per year. Radio 120 may be configured to communicate with other devices, such as lighting sensors, radios, or actuators controlling light fixtures, or mobile devices, using various communication protocols, such as Bluetooth or a wireless mesh network communication protocol. In operation, the electronic processor 110 may place the wireless switch 100 into a rest or sleep mode during periods of inactivity. In rest or sleep mode, the wireless switch 100 may draw less power from the battery 120. This rest or sleep mode may be punctuated by moments wherein the wireless switch exits the rest or sleep mode to transmit a message on the mesh network, spurred by a user interacting with the wireless switch 100 such as by toggling the rocker 102. When operating in the Bluetooth operating mode described above, more power may be necessary. For example, in the Bluetooth operating mode, the radio 120 of the wireless switch 100 may be frequently advertising, or broadcasting invites for other devices to connect to the wireless switch 110 and electronic processor 110 may also be actively listening for invites or advertisements to connect from other devices via the radio 120. In such cases, the electronic processor 110 may refrain from placing the wireless switch 100 in a sleep or rest mode.

The memory 125 may store instructions executable by the electronic processor 110. The electronic processor 110 may operate the wireless switch 100 by executing stored instructions. The instructions may include switch configuration information for the wireless switch 100 or different operating modes for different communication methods for the wireless switch 100. In one embodiment, one operating mode includes a wireless mesh network communication mode, which allows the wireless switch 100 to communicate, via the radio 120, with wireless nodes in a mesh network such as wireless switches, connected lighting devices, and connected switch controllers. In another embodiment, an operating mode includes a Bluetooth operating mode that allows the wireless switch 100 to communicate, via the radio 120, with a mobile device of the user, such as a smartphone, tablet, or laptop. Using a software application on the mobile device, the user may change switch configuration information stored in the memory 125.

The memory 125 may have a bootloader area at memory location 0x0000000, which is where the electronic processor 110 begins execution when the wireless switch 100 is first activated or reboots. The wireless mesh network communication mode instructions, referred to as the wireless mesh stack, may be stored at memory location 0x00004000. Switch-specific instructions may begin at memory location 0x00040000. The Bluetooth operating mode instructions, referred to as the Bluetooth stack, and operating instructions for communicating with a software application on a mobile device of a user, may begin at 0x00000000. Switch configuration data, such as settings flags, parent device identification names or addresses, and other parameters, are stored in a switch configuration memory location, which may begin at 0x000FE000.

An early_init( ) function may be part of a bootloader for the wireless mesh stack. In at least one embodiment, the bootloader calls the early_init( ) function and performs hardware and/or firmware initialization early in a boot-up sequence of the wireless switch 100. During a boot-up sequence, initializations may be performed and then the early_init( ) function returns. During such a boot-up sequence, a thread of operation for the wireless switch 100 may be passed back to the bootloader to load the wireless mesh stack after the early_init( ) function returns, and the wireless switch 100 may be operated by the electronic processor 110 in the wireless mesh network communication mode.

Figure 2:
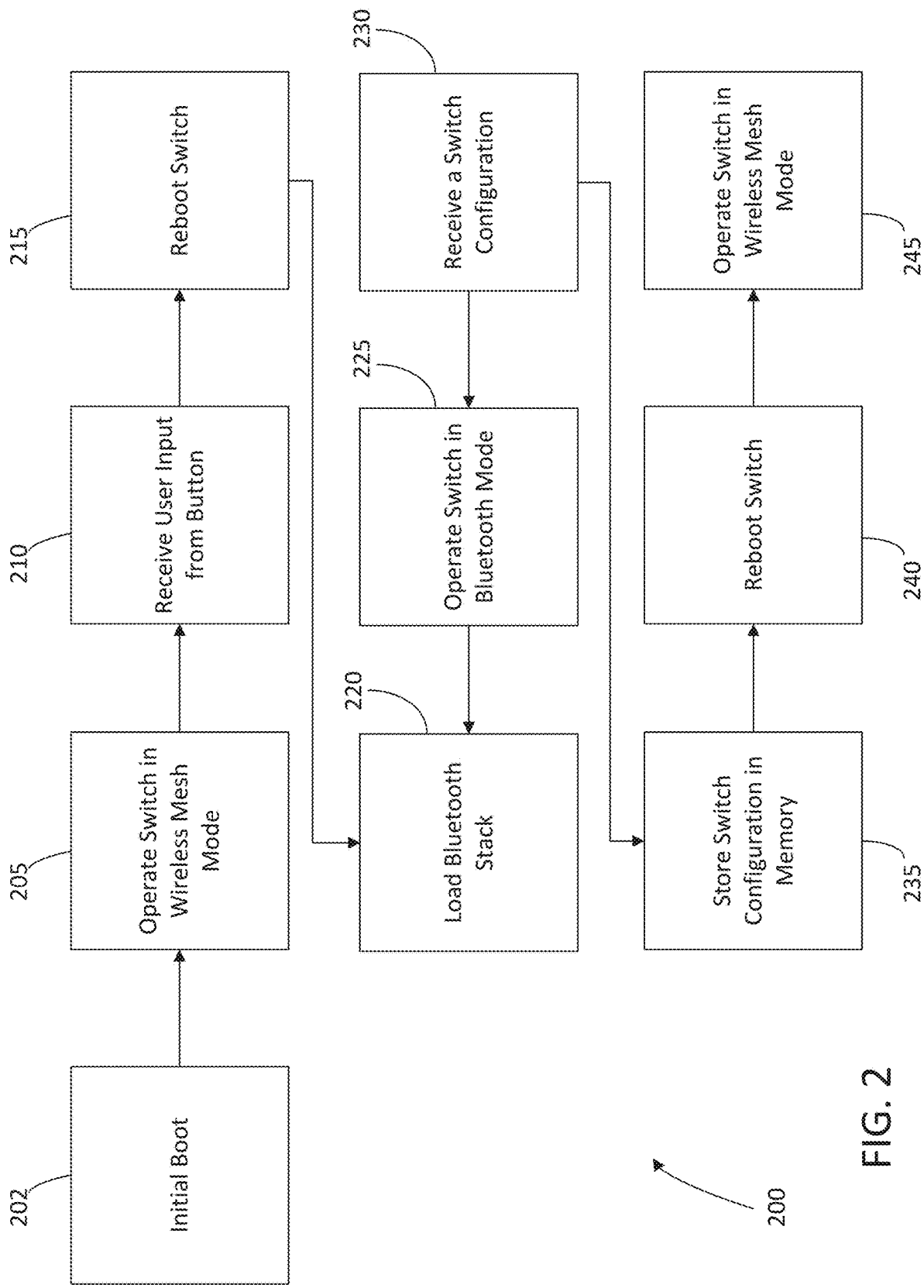
FIG. 2 illustrates a method of operating a wireless switch.

FIG. 2 illustrates a flow chart 200 for operating the wireless switch 100 according to at least one embodiment. At block 202 on initial activation or reboot of the wireless switch 100, the instructions in the bootloader area of the memory 125, as executed by the electronic processor 110, initialize the wireless switch 100. Initialization may include accessing the switch configuration memory location to read settings flags, parent device identification names or address, or other parameters for initialization of the wireless switch 100. One of these instructions may include a function, early_init( ) which examines a Bluetooth flag in the switch configuration memory location to determine which set of instructions to execute. The Bluetooth flag may be de-asserted for loading the wireless mesh stack (e.g. set to 0) or asserted for loading the Bluetooth stack (e.g. set to 1). In the embodiment shown, the Bluetooth flag is de-asserted at initialization, the early_init( ) function is called by the bootloader, and so a mesh network communication stack is loaded for execution by the electronic processor 110.

At block 205, the mesh communications stack is loaded by the electronic processor 110, and the radio 120 is configured to communicate with nodes in a mesh network such as wireless switches, connected lighting devices, and connected switch controllers. In some embodiments where the mesh communications stack is loaded, communication with nodes in the mesh network may occur upon a toggling of the rocker 102. For example, a user may toggle the rocker 102 and, in response, the wireless switch may transmit a message on the mesh network addressed to particular connected lighting devices on the network, instructing them to turn on or off.

At block 210, the electronic processor 110 receives user input via the button 105 of the wireless switch 110. In the embodiment shown, the wireless switch 100 asserts the Bluetooth flag in response to receiving the user input.

At block 215, the electronic processor 110 asserts the Bluetooth flag and reboots the wireless switch 100.

At block 220, the early_init( ) function is called by the bootloader and reads the asserted Bluetooth flag. The bootloader therefore loads the Bluetooth stack for execution by the electronic processor 110, and configures the radio 120 to advertise for BLE connections from BLE enabled devices.

At block 225, electronic processor 110 operates the wireless switch 100 in Bluetooth mode, and causes the radio 120 to advertise for BLE connections from BLE enabled devices. In some embodiments, the radio 120 only broadcasts for connection requests for a predetermined period time, as the Bluetooth communication protocol requires more power from the battery 115. For example, in such embodiments, the radio 120 may only broadcast for one minute before jumping to block 240 and rebooting the wireless switch 100 if no BLE connection is made. Additionally, in some embodiments, once the radio 120 is connected to a device via a BLE connection, the connection may have a predetermined timeout period, such as three minutes, before the connection is terminated to save battery power. In some embodiments, a user of a BLE connection enabled mobile device uses a software application of the mobile device to connect to the wireless switch 100. The user may then use the software application to set a switch configuration for the wireless switch 100, which may then be saved in the switch configuration memory location of the memory 115.

At block 230, the wireless switch 100 receives a switch configuration from a device that has established a BLE connection with the switch. For example, the user of the BLE enabled mobile device may set a new parent device identification name, so that the wireless switch 100 communicates with a new parent device. Other switch configuration changes may also be made during this process by the user making selections in the software application. For example, the set of mesh network nodes that the wireless switch interacts with in mesh communications mode may be changed during this process. As another example, connected lighting devices that the switch may transmit messages to (e.g. "power on" or "power off") on the mesh network may be changed during this process.

At block 235, the switch configuration changes are saved. In some embodiments, a user that made switch configuration changes to the may save the switch configuration changes. For example, the user may chose a "save" option in the software application and, in response, the electronic processor 110 may save the switch configuration settings chosen by the user in memory 125 as switch configuration data. close the software application. In some embodiments, closing the software application may set the Bluetooth flag back to 0. The wireless switch 100 may then be rebooted with the new switch configuration data. In some embodiments, if the BLE connection between the wireless switch 100 and the BLE enabled device is terminated by timeout and not by the user saving switch configuration data, no in-progress switch configuration data changes are saved to the wireless switch.

At block 240, the electronic processor 110 de-asserts the Bluetooth flag and reboots the wireless switch 100.

At block 245, the early_init( ) function is called by the bootloader and reads the de-asserted Bluetooth flag. The bootloader therefore loads the mesh communications stack for execution by the electronic processor 110, and configures the radio 120 to communicate with mesh network nodes and devices connected to the mesh network.

In some embodiments, the flag value for the Bluetooth flag may be set to particular values to indicate an asserted or de-asserted state. For example, the Bluetooth flag may be set to "5" for loading the Bluetooth stack (asserted) or "0" for loading the wireless mesh stack (de-asserted), or some other value, such as "TRUE" for loading the Bluetooth stack (asserted) and "FALSE" for loading the wireless mesh stack (de-asserted). In some embodiments, the Bluetooth flag may be asserted in response to a user input on the button 105. For example, holding down the button 105 for a predetermined time may flip the Bluetooth flag to a de-asserted state if it was in an asserted state when the button 105 was initially pressed and held. Similarly, in some embodiments, holding down the button 105 for a predetermined time flips the Bluetooth flag to an asserted state if it was in a de-asserted state when the button 105 was initially pressed and held.

It is contemplated that the button 105 and the rocker 102 may be replaced by switches, sliders, dials, or other input devices, and still perform their respective functions, described above. It is also contemplated that the respective functions of the button 105 and the rocker 102 may be consolidated into a single input device such as a single button that changes the operating mode of the wireless switch in response to a first interaction, but performs a different function in response to a second interaction. For example, a short press of the single button while the wireless switch 100 is in mesh communications mode may send a "power on" to devices in the mesh network via radio 120, or may authorize the connection of a BLE enabled device, or disconnect a connected BLE enabled device, while a long press of the single button may change the operating mode of the wireless switch.

The following variations are intended to enumerate several embodiments of the products and methods described above, and are not intended to limit to the scope of the disclosure or the claims:

Variation 1 may include a wireless switch, the wireless switch comprising: an input device; a radio; a memory; and an electronic processor configured to operate the wireless switch in a wireless mesh network communication mode based on a mode selection indicator being in an asserted state, and operate the wireless switch in a wireless Bluetooth mode based on the mode selection indicator being in a de-asserted state.

Variation 2 may include the wireless switch of variation 1, wherein the input device is a button.

Variation 3 may include the wireless switch of any of the variations above, further comprising a battery, wherein the electronic processor and radio are powered by the battery.

Variation 4 may include the wireless switch of any of the variations above, wherein the wireless switch is configured connect to a Bluetooth enabled device via the radio while the wireless switch is operating in the Bluetooth mode.

Variation 5 may include the wireless switch of any of the variations above, wherein the wireless switch is configured to receive switch configuration data via the radio while the wireless switch is operating in the Bluetooth mode.

Variation 6 may include the wireless switch any of the variations above, wherein the electronic processor is configured to save received the switch configuration to the memory.

Variation 7 may include the wireless switch any of the variations above, wherein the wireless switch is configured connect to a mesh communication network via the radio while the wireless switch is operating in the Bluetooth mode.

Variation 8 may include the wireless switch any of the variations above, wherein the input device comprises a button, and wherein in response a pressing of the button, the mode selection indicator changes from an asserted state to a de-asserted state, or from an asserted state to a de-asserted state.

Variation 9 may include the wireless switch any of the variations above, wherein the electronic processor is further configured to reboot the wireless switch a first time following the pressing of the button.

Variation 10 may include the wireless switch any of the variations above, wherein the electronic processor is further configured to reboot the wireless switch a second time following the pressing of the button.

Variation 11 may include the wireless switch any of the variations above, further comprising a second input device, wherein the electronic processor is configured to cause the radio to transmit data in response to the second input device being toggled.

Variation 12 may include the wireless switch any of the variations above, further comprising a second input device, wherein the electronic processor is configured to authorize a connection to the wireless switch via the radio in response to the second input device being toggled.

Variation 13 may include a method of changing a switch configuration of a wireless switch comprising: loading, by an electronic processor of the wireless switch, an initial configuration of the wireless switch into a memory of the wireless switch; loading, by the electronic processor, a Bluetooth stack into the memory; executing, by the electronic processor, the Bluetooth stack; establishing, by the electronic processor, a connection between a radio of the wireless switch and a Bluetooth enabled device; receiving, by the radio, a switch configuration from the Bluetooth enabled device; saving, by the electronic processor, the switch configuration to the memory; loading, by the electronic processor, the switch configuration into the memory; loading, by the electronic processor, a mesh communications stack into the memory; and, executing, by the electronic processor, the mesh communications stack.

Variation 14 may include method of variation 13 further comprising, reading, by the electronic processor, a Bluetooth flag in the memory; determining, by the electronic processor, that the Bluetooth flag is asserted; and, placing, by the electronic processor, the wireless switch in a Bluetooth mode.

Variation 15 may include the method of variations 13 or 14, further comprising, reading, by the electronic processor, a Bluetooth flag in the memory; determining, by the electronic processor, that the Bluetooth flag is de-asserted; and, placing, by the electronic processor, the wireless switch in a mesh communications mode.

Therefore, embodiments disclosed herein provide, among other things, a wireless switch.

Various features, advantages, and embodiments are set forth in the following claims.

What is claimed is:

1. A wireless switch, the wireless switch comprising:
an input device;
a radio;
a memory; and
an electronic processor configured to:
place a mode selection indicator in an asserted state in response to a first manipulation of the input device;
load a first communication stack of a plurality of communication stacks into the memory in response to the first manipulation of the input device; and,
operate the wireless switch in a communication mode associated with the first communication stack with the mode selection indicator being placed in the asserted state.

2. The wireless switch of claim 1, wherein the communication mode is a mesh communication mode and wherein the wireless switch is configured connect to a mesh communication network via the radio while the wireless switch is operating in the mesh communication mode.

3. The wireless switch of claim 1, the electronic processor further configured to:
place the mode selection indicator in a de-asserted state in response to a second manipulation of the input device; and,
operate the wireless switch in a Bluetooth mode with the mode selection indicator being placed in the de-asserted state.

4. The wireless switch of claim 3, wherein the input device comprises a button,
wherein the first manipulation of the input device includes a first pressing of the button, and
wherein the second manipulation of the input device includes a second pressing of the button.

5. The wireless switch of claim 3, wherein the wireless switch is configured connect to a Bluetooth enabled device via the radio while the wireless switch is operating in the Bluetooth mode.

6. The wireless switch of claim 5, wherein the wireless switch is configured to receive switch configuration data via the radio while the wireless switch is operating in the Bluetooth mode.

7. The wireless switch of claim 6, wherein the electronic processor is configured to save received the switch configuration data to the memory.

8. A method of selecting an operating mode for a wireless switch comprising:
detecting, via an electronic processor of the wireless switch, a first manipulation of an input device of the wireless switch;
placing, via the electronic processor, a mode selection indicator in an asserted state in response to detecting the first manipulation of the input device;
loading a first communication stack of a plurality of communication stacks into the memory in response to the first manipulation of the input device; and,
operating, via the electronic processor, the wireless switch in a communication mode associated with the first communication stack with the mode selection indicator being placed in the asserted state.

9. The method of claim 8, wherein the communication mode is a mesh communication mode and wherein the wireless switch connects to a mesh communication network via a radio of the wireless switch while the wireless switch is operating in the mesh communication mode.

10. The method of claim 8, further comprising:
placing, via the electronic processor, the mode selection indicator in a de-asserted state in response to a second manipulation of the input device; and,
operating, via the electronic processor, the wireless switch in a Bluetooth mode with the mode selection indicator being placed in the de-asserted state.

11. The method of claim 10 wherein the input device comprises a button,
wherein the first manipulation of the input device includes a first pressing of the button, and
wherein the second manipulation of the input device includes a second pressing of the button.

12. The method of claim 10, wherein the wireless switch is configured connect to a Bluetooth enabled device via a radio of the wireless switch while the wireless switch is operating in the Bluetooth mode.

13. The method of claim 12, wherein the wireless switch is configured to receive switch configuration data via the radio while the wireless switch is operating in the Bluetooth mode.

14. The method of claim 13, wherein the electronic processor is configured to save the received switch configuration data to a memory of the wireless switch.

15. A non-transitory, computer-readable medium containing instructions that, when executed by an electronic processor, are configured to perform a set of functions, the set of functions comprising:
detecting a first manipulation of an input device of a wireless switch;
placing a mode selection indicator of the wireless switch in an asserted state in response to detecting the first manipulation of the input device;
loading a first communication stack of a plurality of communication stacks into the memory in response to the first manipulation of the input device; and,
operating the wireless switch in a communication mode associated with the first communication stack with the mode selection indicator being placed in the asserted state.

16. The non-transitory, computer readable medium of claim 15, the set of functions further comprising:
  placing the mode selection indicator in a de-asserted state in response to a second manipulation of the input device; and,
  operating the wireless switch in a second communication mode with the mode selection indicator being placed in the de-asserted state.

17. The non-transitory, computer readable medium of claim 16, the set of functions further comprising:
  connecting a radio of the wireless switch to a Bluetooth enabled device via the radio while the wireless switch is operating in the second communication mode.

18. The non-transitory, computer readable medium of claim 17, the set of functions further comprising:
  receiving switch configuration data via the radio while the wireless switch is operating in the second communication mode.

19. The non-transitory, computer readable medium of claim 18, the set of functions further comprising:
  saving the received switch configuration data to a memory of the wireless switch.

20. The non-transitory, computer readable medium of claim 15, the set of functions further comprising:
  rebooting the wireless switch following the first manipulation of the input device.

* * * * *